US008332265B2

(12) United States Patent
Tonielli (10) Patent No.: US 8,332,265 B2
(45) Date of Patent: Dec. 11, 2012

(54) SYSTEM AND METHODS FOR ONLINE PERFORMANCE MANAGEMENT

(75) Inventor: Chris S. Tonielli, Greensboro, NC (US)

(73) Assignee: American Express Travel Related Services Company, Inc., New York, NY (US)

( * ) Notice: Subject to any disclaimer, the term of this patent is extended or adjusted under 35 U.S.C. 154(b) by 1192 days.

(21) Appl. No.: 11/617,471

(22) Filed: Dec. 28, 2006

(65) Prior Publication Data

US 2007/0224579 A1 Sep. 27, 2007

Related U.S. Application Data

(60) Provisional application No. 60/755,105, filed on Dec. 30, 2005.

(51) Int. Cl.
 *G06Q 10/00* (2012.01)
(52) U.S. Cl. ...................................... 705/7.42; 705/7.38
(58) Field of Classification Search ...................... 705/11
 See application file for complete search history.

(56) References Cited

U.S. PATENT DOCUMENTS

| | | | |
|---|---|---|---|
| 6,754,874 B1 * | 6/2004 | Richman | 715/205 |
| 2002/0184085 A1 * | 12/2002 | Lindia et al. | 705/11 |
| 2003/0130885 A1 * | 7/2003 | Calderaro et al. | 705/11 |
| 2004/0088177 A1 * | 5/2004 | Travis et al. | 705/1 |
| 2005/0021391 A1 * | 1/2005 | Lu et al. | 705/11 |
| 2009/0327051 A1 * | 12/2009 | Nerby | 705/11 |

* cited by examiner

*Primary Examiner* — Elizabeth Rosen
(74) *Attorney, Agent, or Firm* — Snell & Wilmer L.L.P.

(57) ABSTRACT

A system, method and computer program product are provided for performance management. A member within an entity is selected and a performance assessment of the member is conducted. The information collected from the performance assessment is stored in a database. A self-assessment by the member is conducted and the information from the self-assessment is also stored in the database. An appraisal of the member is conducted using the data from both the performance assessment and the self-assessment and the information obtained from the appraisal is stored.

18 Claims, 9 Drawing Sheets

| STEP1: METRICS | STEP2: COMPETENCIES | STEP 3: PREVIEW | STEP 4: DELIVER | STEP 5: ACKNOWLEDGE 1-TO-1 |
|---|---|---|---|---|

| EDIT | DELETE | COMPETENCY | SubCategory | STANDARD COMMENT | TL COMMENT | RATING |
|---|---|---|---|---|---|---|
| ☐ | ☒ | DRIVES RESULTS | EFFECTIVENESS | AT TIMES, ALLOWS THE CUSTOMER TO CONTROL THE CONVERSATION AND IS UNABLE TO OVERCOME OBJECTIONS | AT TIMES, SARAH ALLOWS THE CUSTOMER TO CONTROL THE CONVERSATION AND IS UNABLE TO OVERCOME OBJECTIONS. FOLLOWING THE REQUIRED/RELEVANT SCRIPT IS A SIMPLE SOLUTION TO THIS PROGRAM. | 4 |
| ☐ | ☒ | DEMONSTRATES KNOWLEDGE OF THE GROUP/ENTITY | JOB KNOWLEDGE | OFTEN FAILS TO BALANCE PERFORMANCE BY NOT MEETING EXPECTATIONS IN 1 OR MORE METRIC | SARAH NEEDS TO FIND A BETTER BALANCE IN HER PERFORMANCE BY WORKING TO MEET EXPECTATIONS. | 4 |
| ☐ | ☒ | DEMONSTRATES PERSONAL EXCELLENCE | SKILLS DEVELOPMENT | AT TIMES, STRUGGLES WITH LEARNING NEW POLICIES, METRICS OR SKILLS | AT TIMES, SARAH STRUGGLES WITH LEARNING NEW POLICIES, METRICS OR SKILLS. CCME IS NEW IN THE LAST YEAR SHOULD BE HABIT BY NOW BUT IS NOT. MASTERING THIS VERBIAGE WILL BE A BIG WIN IN SARAH'S APPROACH. | 4 |

ADD NEW COMMENT

ENTER OVERALL COMMENTS

YOUR OVERALL PERCENTILE HAS BEEN BETWEEN 50-60TH SO FAR THIS YEAR. AT THE END OF APRIL YOU'RE IN THE 59TH PERCENTILE. YOU HAVE THE CAPABILITY OF BEING A MORE EFFECTIVE COLLECTOR AND WE'RE GOING TO WORK TOGETHER TO HONE YOUR SKILLS. BECOMING MORE SKILLED IN THE CCME CALL FLOW AND OVERCOMING OBJECTIONS WILL IMPACT BOTH YOUR PRODUCTIVITY AND YOUR EFFECTIVENESS.

FIG. 4C

QUESTIONNAIRE

QUESTIONNAIRE:

Q1: HOW WOULD YOU RATE THE NEW RPM
COMPARED TO THE PREVIOUS COMP REPORT
THAT USED TO PROVIDE YOUR STATS?  ○ NOT APPLICABLE  ○ BELOW EXPECTATIONS  ○ MEET EXPECTATIONS  ○ EXCEED EXPECTATIONS

Q2: DID YOUR TEAM LEADER GO OVER
EACH OF YOUR QUALITY MONITORS WITH YOU?  ○ YES  ○ NO

Q3: DO YOU FEEL THAT THE NEW RPM HAS
ALLOWED YOU TO "SELF-SERVICE" YOUR
STATS AND COACH YOUR OWN PERFORMANCE?  ○ YES  ○ NO

[SUBMIT]

SYSTEM AND METHODS FOR ONLINE PERFORMANCE MANAGEMENT

CROSS REFERENCE TO RELATED APPLICATIONS

This utility application claims priority to, and the benefit of, U.S. Provisional Application No. 60/755,105, filed Dec. 30, 2005, which is hereby incorporated herein by reference in its entirety.

TECHNICAL FIELD OF THE PRESENT INVENTION

The present invention relates generally to an online performance management system. More specifically, the present invention relates to an online performance management system that provides performance reviews of individuals or associates within an entity or business unit online and provides interaction between the individuals/employees/associates and their team leaders in performance reviews within a given period.

BACKGROUND OF THE PRESENT INVENTION

Performance appraisals and reviews of individuals such as employees or associates within an entity are usually based on non-uniform benchmarks or inconsistent review methods. In practice, different measures of performance are used to review or appraise individuals for their performance, resulting in a non-uniform review and assessment system. In addition, numerous different reports are generated manually in print—thus requiring a review of numerous reports with different benchmarks for performance. A normal comparative review of employees would entail a time-consuming process in which the reviewing individual would have to find, review and reconcile different reports.

BRIEF DESCRIPTION OF THE INVENTION

Generally, it is an object of this present invention is to ensure that the performance appraisal and review process become more succinct and easy to use. The present invention further provides a uniform system of weighing performance by the provision of a consistent performance benchmark system across an entity or business unit.

It is also an object of the present invention to provide individual feedback online and to permit individuals within an entity to see and compare their performance relative to their performance goals. Individuals may then identify the forces that drive their performance and use this information to improve their performance. Evaluators or team leaders select certain performance indicators or metrics results for an individual's performance within a given period. Performance indicators or metrics are measures of an individual's performance, examples of which may include an individual's average handling time on a call, the percentage of dollars collected or calls handled by an individual per hour. Where individuals or employees need additional focus, employees or team leaders may enter competency comments and then preview the completed review before delivering the feedback. The system allows for consistency as it utilizes metric data generated by certain systems which assess all individuals in an entity or business unit uniformly. An example of such a system is the one envisioned by the invention in provisional application No. 60/755,499, now application Ser. No. 11/617,334, entitled "Reporting Performance Metrics" ("RPM"), the entire disclosure of which is incorporated herein by reference. The system according to the present invention may be linked with other external systems to facilitate the exchange of data and reports associated with individuals within an entity.

It is yet another object of the present invention to provide an online performance management process where an individual or individuals is/are selected and assessed based on their performance. The online performance management process allows the individual and/or individuals to conduct a self-assessment of their performance. The information gathered during these assessments is then stored and used in conducting a final appraisal of the individual or individuals. The information obtained and generated as a result of this appraisal is then stored.

It is a further object of the present invention to provide an online performance management process where the performance data for a selected individual or individuals is imported from one or more external systems and/or databases and feedback provided based on the imported data. The individual or individuals may then provide their input with respect to the provided feedback and the data compiled by these actions is then compiled, previewed and stored.

The process begins with a 1-to-1 session between an individual and the individual's team leader followed by the automatic transfer of the individual's performance data into a coaching environment. The individuals and leaders use this information periodically for coaching through a web-based online one-to-one setup. The information obtained during this 1-to-1 session is then stored for review and incorporation into the individual's mid-year appraisal. The system concludes with a comprehensive array of online coaching features developed to foster a year-round coaching style, culminating in an automated year-end appraisal.

The system, as envisioned in the present invention, standardizes the coaching process for individuals within a business unit. This standardization ensures that all coaching is performed in a consistent and comprehensive manner. The design of the coaching represents a set of best practices, which ensures that all coaching sessions are thorough, complete, and detailed. By regular use of the system, leaders may now be able to conduct highly effective coaching programs.

In one aspect of the present invention, a system, method and computer program product are provided for online performance management. A member within an entity is selected and a performance assessment of the member is conducted. The information collected from the performance assessment is stored. A self-assessment by the member is conducted and the information from the self-assessment is also stored. An appraisal of the member is conducted using the data from both the performance assessment and the self-assessment and the information obtained from the appraisal is stored.

The system as envisioned in the present invention, provides advantages including: overcoming the redundancy of performance data input into the system; Enhanced interaction with other systems, databases, etc., that may require the use of the information or data developed therein or herein; creation of a consistent utility-wide system for coaching and assessing individual or personnel performance; facilitating and promoting participation by more individuals, leaders and personnel; ease of access to stored feedback over any given time; ease and flexibility of data input; improvement in individual productivity by way of improved coaching tools and methods; reduced team leader preparation time for one-to-one reviews; standardization of the coaching process—thereby providing dissemination of best practices throughout an organization or business unit; performance of regular and consistent reviews; and frequent update of information/data accumulated or developed.

Further features and advantages of the present invention as well as the structure and operation of various embodiments of the present invention are described in detail below with reference to the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures.

DETAILED DESCRIPTION

The present invention is now described in more detail herein in terms of an exemplary systems, methods and program products for an online performance management process over a network. This is for convenience only and is not intended to limit the application of the present invention. In fact, after reading the following description, it will be apparent to one skilled in the relevant art(s) how to implement the following invention in alternate embodiments (e.g., one of or a combination of network data traffic protocols such as TCP/IP; IPX/SPX; Bluetooth; Appletalk or any present or future data traffic protocols currently known or later derived).

Figure 1:
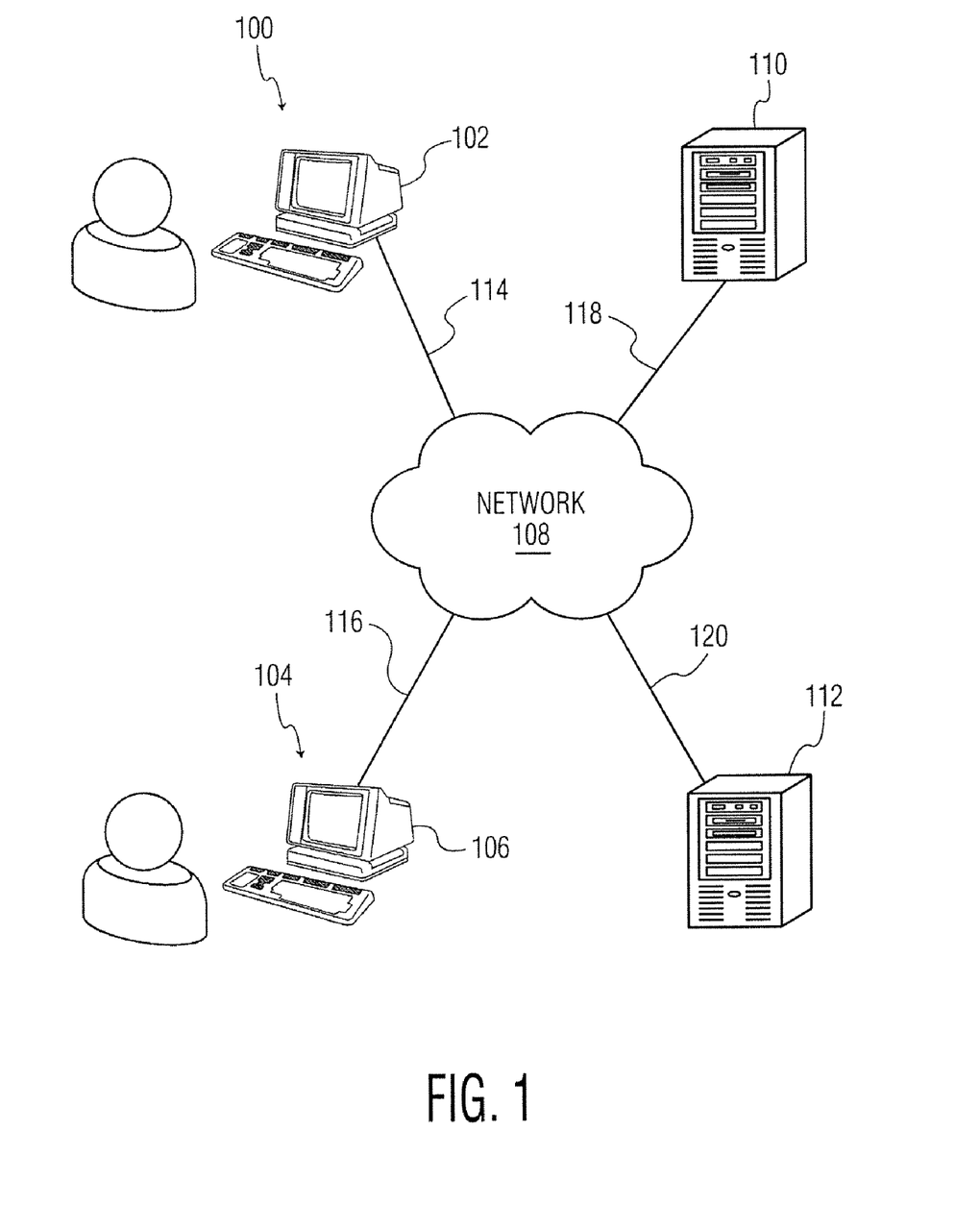
FIG. 1 illustrates a system diagram in accordance with an exemplary embodiment of the present invention.

FIG. 1 illustrates a system diagram in accordance with an exemplary embodiment of the present invention. An individual's computer or terminal 100 and a team leader's computer or terminal 104 are interconnected via a network 108.

An individual's (e.g., associate's) and team leader's computers/terminals may be interconnected with web and database servers (110 and 112).

In another exemplary embodiment of the invention, the system may also be implemented as computer software modules that may be loaded onto a local computer or system without use or need for a network system or servers. Database server 112 may be configured to receive individual (e.g., associate) and team leader data from over the network 108 by way of data communication paths 114, 116 and 120. Intra/inter-network and online capability can be used to streamline data transfer and use of the information/data generated by and for other systems and/or databases. The online performance management process may be implemented on a variety of networks including, but not limited to, intranet, internet, extranet, WAN, LAN networks and/or the like. The present invention may be implemented by hardware and/or software configured to perform the tasks or functions herein.

Figure 2:
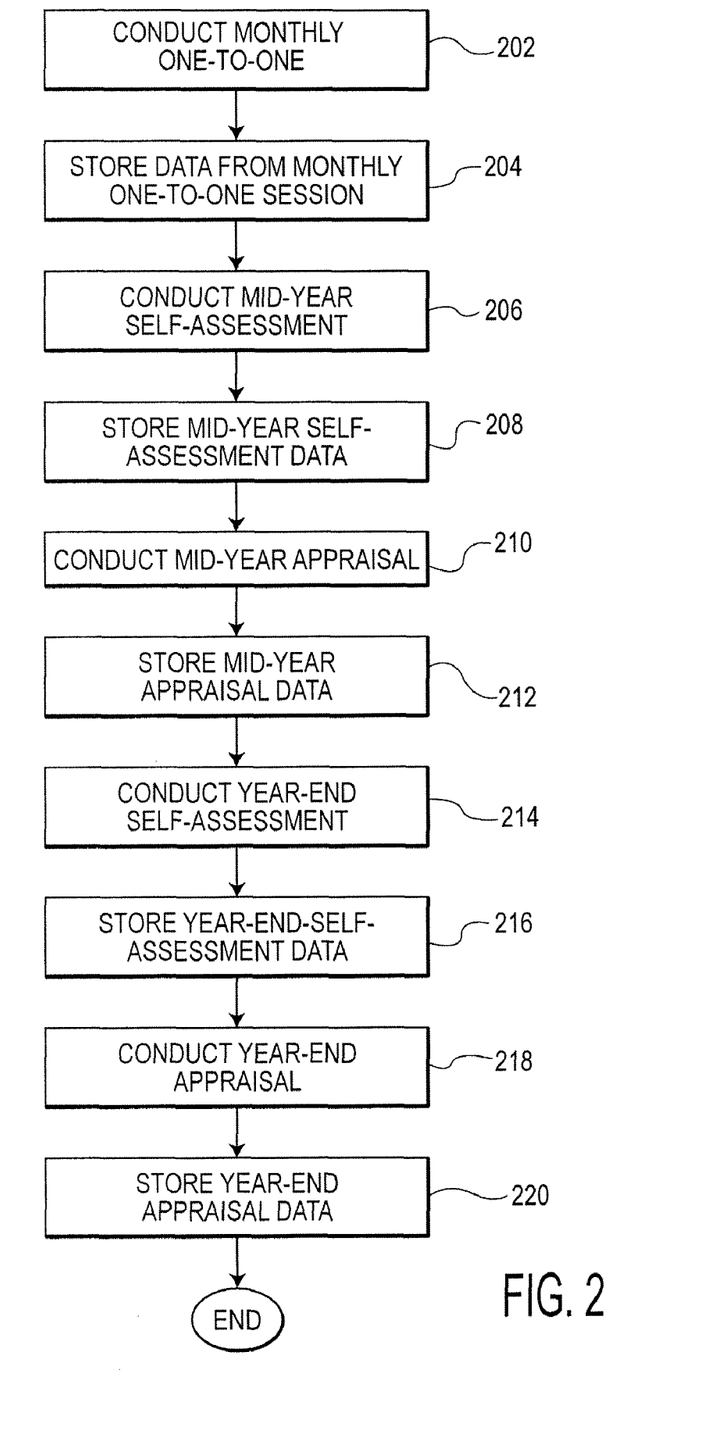
FIG. 2 is a flow chart showing the overall process in accordance with another exemplary embodiment of the present invention.

Referring now to FIGS. 1 and 2, a team leader and a selected individual conduct 1-to-1 sessions (FIG. 2, step 202). Individuals can be personnel, employees, associates, members of a group and the like. In addition, individuals need not be individual persons but instead can be individual entities. Accordingly, the present invention can be used to review the performance of one or more persons or one or more entities, or a combination of both.

The individual and team leader are linked via network 108 and data communication paths 114 and 116 and both log on to web server 110. The sessions may be conducted over a certain period of the year, for instance, over the first six months of a given year. Prior to each 1-to-1 session, individuals enter comments into an online journal. Their entries may include, inter alia, their contributions, explanations for their performance, coaching needs or recommendations to management, etc. The individual accomplishes this by logging on to the system at computer/terminal 100 and accessing the web server 108. Web server 110 serves as a hosting server for the system's website. In one embodiment, the application/system in accordance with this invention is resident on web server 110. As such, instruction code for all functions is resident on web server 110. Web server 110 and database server 112 may each comprise a number of components including data storage, a processor or CPU, RAM and ROM (not shown). Each component may be communicably connected with the processor. The web server and database server processors are configured to process performance data received for individuals. In another embodiment, web server 110 and database server 112 may be configured to use resident computer readable media, software or instruction code stored in the processor to make certain calculations, comparisons determinations, generate certain values, etc., as required in the present invention and as used in ranking individuals as further discussed below. In a further embodiment, web server 110 and database server 112 may be configured to receive and store certain predetermined benchmark values used in assessing and ranking individuals' performance. These values may be manually entered into the servers or may be generated as a result of the resident instruction code.

The individual's journal entries and/or comments are transmitted and stored on database server 112 via data communication paths 114 and 120 through network 108. The individual's journal entries and/or comments are then stored with the data storage component of database server 112. Performance data for an individual is imported from a performance management system which may be resident on web server 110 and displayed on display devices 102 and 106 via network 108 and data communication paths 114, 116 and 118. This can occur, for example, during each session. An example of an external performance management and rating system is the one envisioned in provisional application No. 60/755,499, now application Ser. No. 11/617,334, entitled "Reporting Performance Metrics" ("RPM"), the entire disclosure of which is incorporated herein by reference. In an exemplary embodiment, the individual's performance data may be imported from one or more of such external performance management and rating systems and/or databases to which the system of the present invention may be linked. The individual's journal entries are also imported from database server 112 as shown in step 202. The imported information or data may then be displayed or shown on display devices 102 and 106 as made possible by web server 110. The team leader then provides feedback based on the individual's performance and the individual's journal entries. After the 1-to-1 session/process is closed or completed, the data generated or developed during the 1-to-1 session (e.g., the team leader's comments, feedback, recommendations, etc.) is then stored for future use as shown in step 204. Such data is stored on database server 112 and may be viewed by the team leader on display device 106. Next, the individual conducts a mid-year self-assessment at step 206. Here, the individual assesses his/her performance and provides comments. The information or comments the individual provides are stored on the storage component of database server 112 for review and future use as shown at step 208. The team leader, after logging on to web server 110, conducts a mid-year appraisal of the individual based on the individual's performance and the individual's comments, as shown at step 210. At step 212, the comments made by the team leader are entered at computer/terminal 104, scored and stored on database server 112. These scores are used to create an overall score that assesses the individual's performance.

Following the mid-year appraisal at step 214, the individual conducts a year-end self-assessment and the team leader conducts a year-end appraisal of the individual at step 218. The corresponding data or information generated and/or provided by both the individual and the team leader during the year-end self-assessment and appraisal is stored on database server 112 in steps 216 and 220, respectively. The individual's year-end self-assessment data is entered by the individual at computer/terminal 100 while the team leader's year-end appraisal is entered at computer/terminal 104. In an exemplary embodiment, both the individual and the team leader may enter their data at any one computer/terminal which is connected with the network 108, even the same computer/terminal. The data generated or compiled at each step is stored and made readily available for use in subsequent processes.

Figure 3:
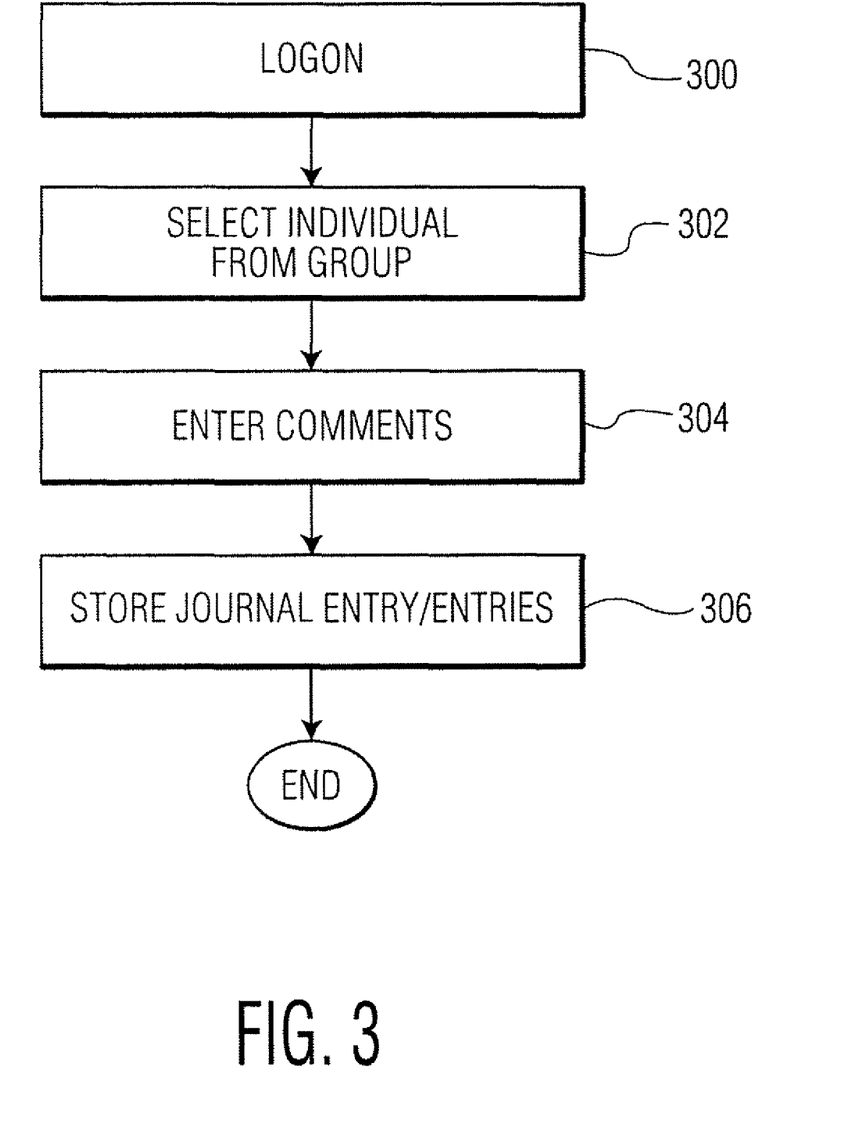
FIG. 3 is a flow chart showing a journal entry process in accordance with yet another exemplary embodiment of the present invention.

Referring to FIG. 3, a flow chart illustrating the daily online journal entry process by an individual is shown. At step 300, the individual to be assessed and the individual's team leader log on to the web server 110 via respective computers/terminals 100 and 104 and network 108. The team leader then selects the individual to be assessed at step 302 after viewing all possible individuals listed on display device 106. Prior to the team leader's selection, the individual may enter comments in the individual's journal (step 304) at computer/terminal 100 as shown at step 304. The individual's entries may include comments on their performance, comments about the coaching needs, recommendations to management, information regarding recognition received, results achieved by the individual or mention of special roles undertaken by the individual. In addition, the individual may state his/her personal goals and/or coaching needs. The team leader will be able to view these comments on display device 106 or any other display device linked with network 108 as the individual makes the entries. Next, the individual's entries are stored on database server 112 for future use as shown at step 306.

Figure 4A:
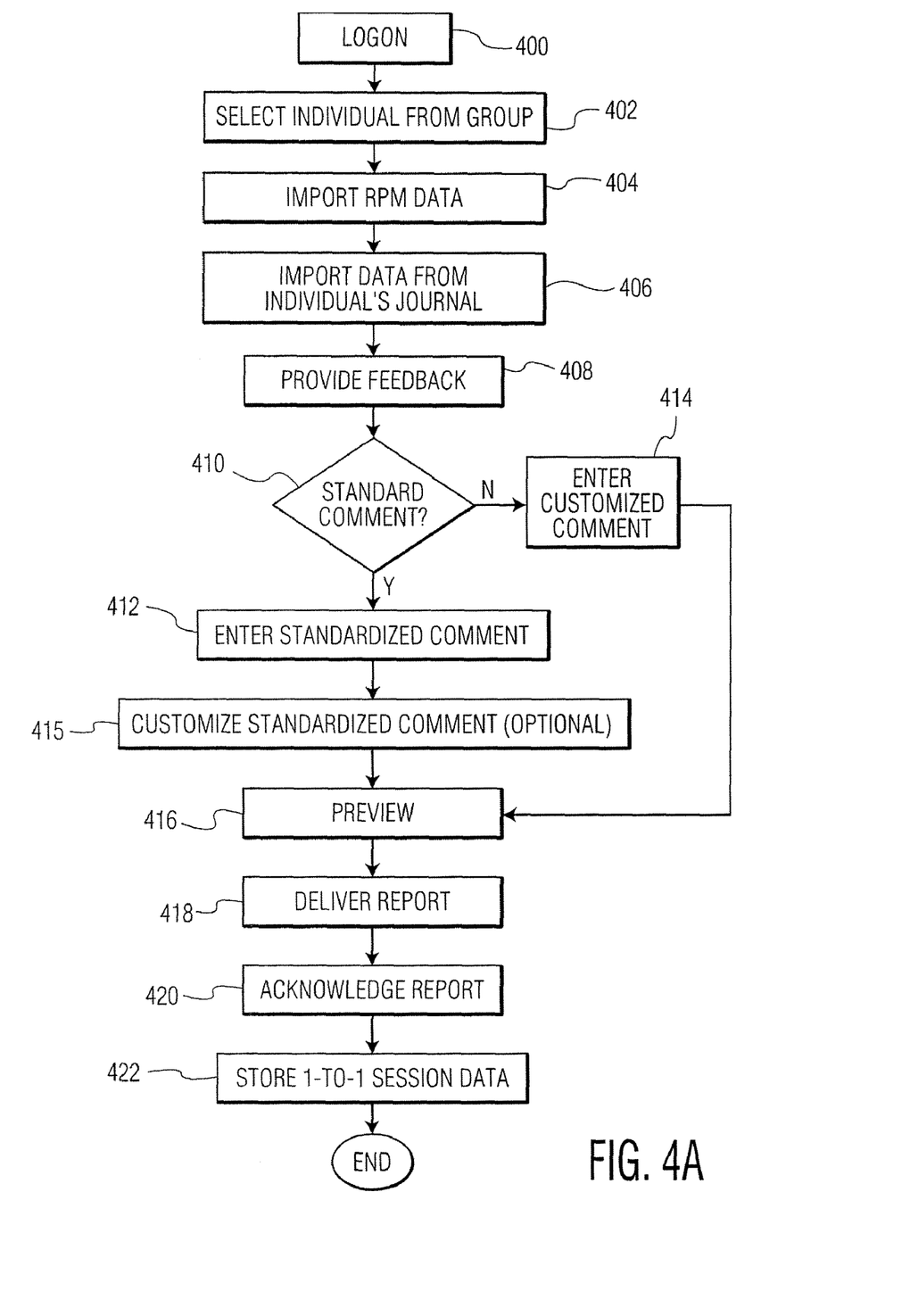
FIG. 4A is a flow chart showing a 1-to-1 review process in accordance with a further exemplary embodiment of the present invention.

Referring now to FIG. 4A, a flow chart illustrating a 1-to-1 review session is shown. At step 400, both parties to the 1-to-1 session log on to the system at computers/terminals 100 and 104, and network 108 after which the reviewer or the team leader selects the individual to be reviewed as shown at step 402. In another embodiment, both the individual and the team leader may conduct the 1-to-1 session at the same computer/terminal. At step 404, the database server 112 is prompted by the web server 110 to import measures of performance or metrics for the individual from at least one performance management and rating system such as the one envisioned in application Ser. No. 11/617,334 entitled "Reporting Performance Metrics" ("RPM"), the entire disclosure of which is incorporated herein by reference in its entirety.

Figure 4B:
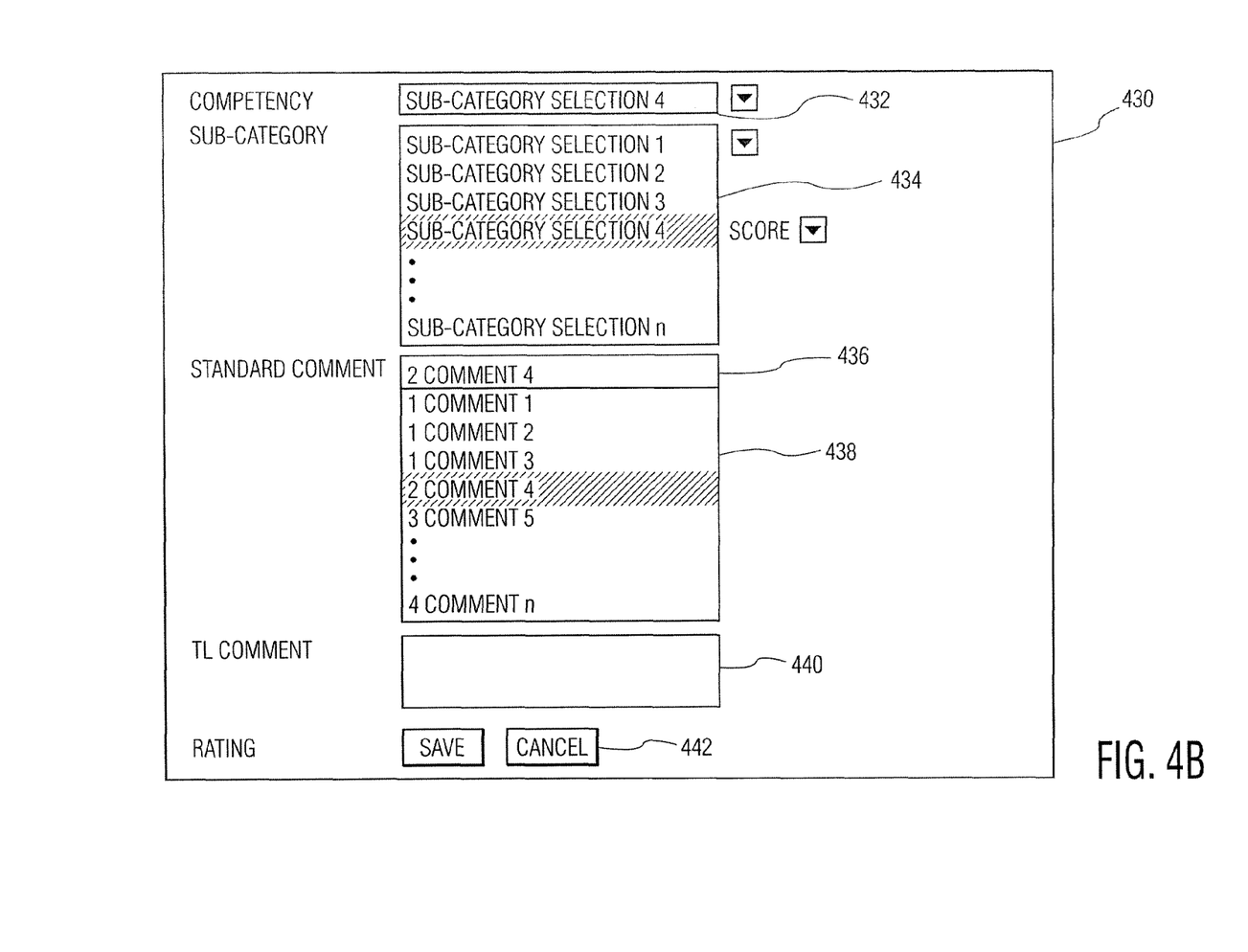
FIG. 4B illustrates a display of comments in accordance with a further exemplary embodiment of the present invention.
Figure 4C:
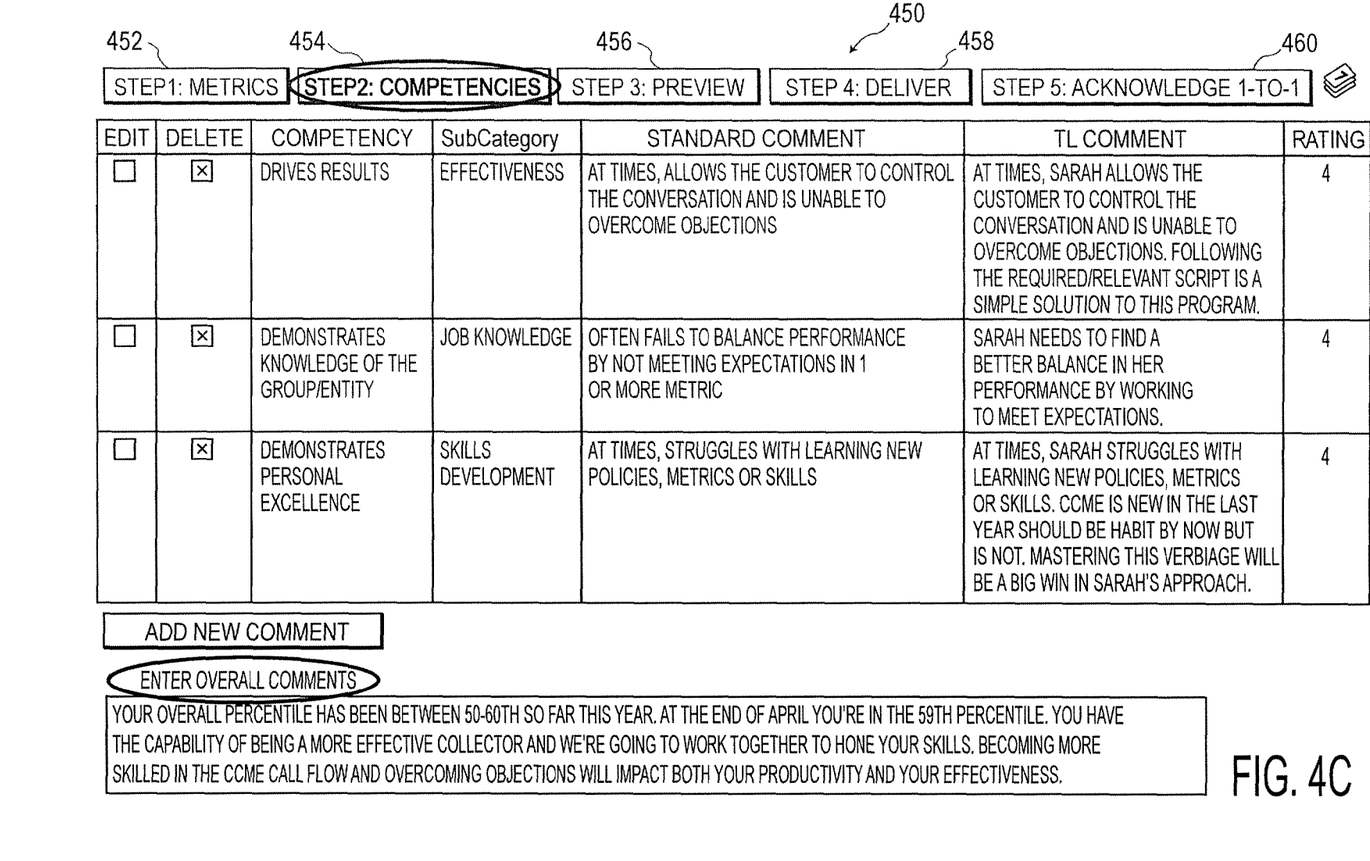
FIG. 4C illustrates a display of comments and ratings in accordance with a further exemplary embodiment of the present invention.

The team leader can then select any one or a collection of these measures of performance or metrics to focus on coaching the selected individual during a given month and/or provide feedback/commentary on the selected metric(s). After the individual's metric data has been imported, the individual's journal entries are imported from database server 112 (step 406) as previously stored in step 306 of FIG. 3. The team leader, after selecting and reviewing the individual's metrics and individual's comments, provides feedback based on the individual's performance metrics and journal entries as shown at step 408. The team leader may then provide feedback on the individual's competency by selecting or clicking on the "Competencies" button 454 as shown in exemplary screen shot 450 in FIG. 4C. The team leader's feedback (as transmitted to and stored on database server 112) in either case may be selected from a standard set of comments within the system at step 412 or customized to address more specific behaviors or performance at step 414. Alternatively, a combination of both standardized and customized comments can be entered. These comments are then retrieved from database server 112 and are viewed by the team leader on display device 106. The team leader also has the option of customizing comments at step 415. Comments may be provided as shown exemplary screen shot 430 of FIG. 4B and broken down into sub-categories for easy sorting. Each comment has a corresponding assigned rating based on a predetermined rating system resident on database server 112. For example, standard comments 1-3 as shown in section 438 of FIG. 4B may be assigned a rating of "1" each while comment 4 in section 438 may have a rating of "2". The ratings may be displayed next to or at the end of each comment. Each selected comment is highlighted as shown in section 438 (comment 4 has been selected) and may be displayed in selection box 436. The ratings are assigned so that the team leader's comments can be chosen for future use in the overall review process. This simplifies the assessment of an individual's performance because the team leader can accurately reference specific feedback that has been shared throughout the year. The team leader may enter customized comments in comment section 440.

Referring to FIG. 4A, after the team leader has provided his/her comments, the team leader then previews the comments and data at step 416. The information imported or provided (e.g., team leader's comments) populate a predetermined template located on database server 112. The template, after being populated, constitutes a report, which may now be displayed, printed, stored or transferred. The report may then be delivered or sent to the assessed individual at step 418. At step 420, the individual acknowledges the received report. The individual then views the report on display device 102. Instead of communicating the report electronically via the system shown in FIG. 1, the report(s) may also be sent by another form of communication system such as by facsimile.

Figure 4D:
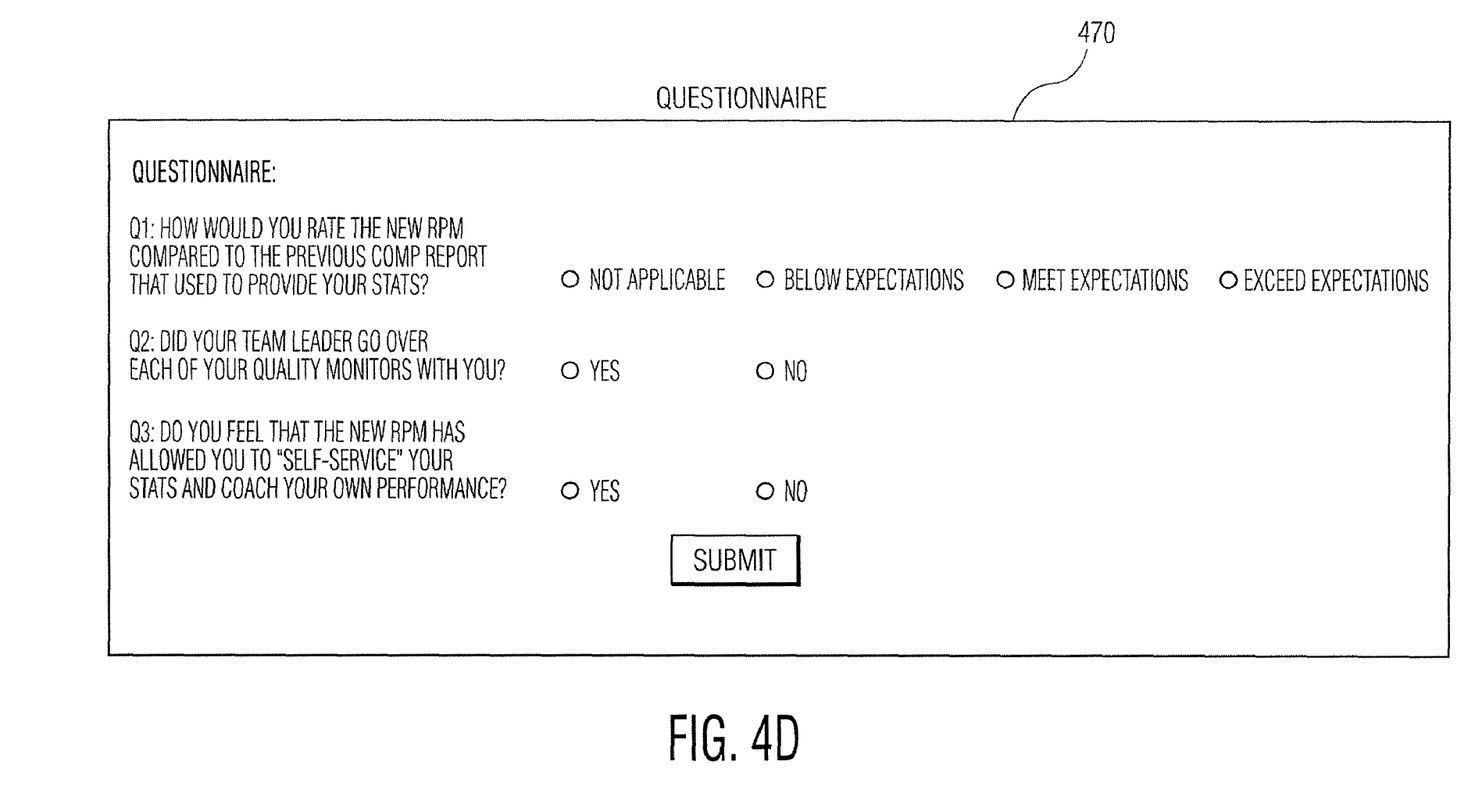
FIG. 4D illustrates a questionnaire in accordance with yet a further exemplary embodiment of the present invention.

Acknowledgment of the 1-to-1 session by the individual, as shown in FIG. 4D, may include, in one embodiment, a questionnaire as shown in exemplary screen shot 470. The questionnaire may focus on new initiatives, recent training, feedback on coaching, etc. Alternatively, the individual may acknowledge the 1-to-1 after being prompted to enter some identification such as their LAN ID or their password to the system at computer/terminal 100 or any other terminal in the system and click/select the "Acknowledge" button 460 of FIG. 4C. Acknowledgment may be accomplished by submitting a questionnaire and/or selecting the "Acknowledge" button 460. After the individual acknowledges the report, the 1-to-1 session is then closed and cannot be altered. The report and all other data generated or retrieved during the 1-to-1 session/process is then stored on database server 112.

Figure 5:
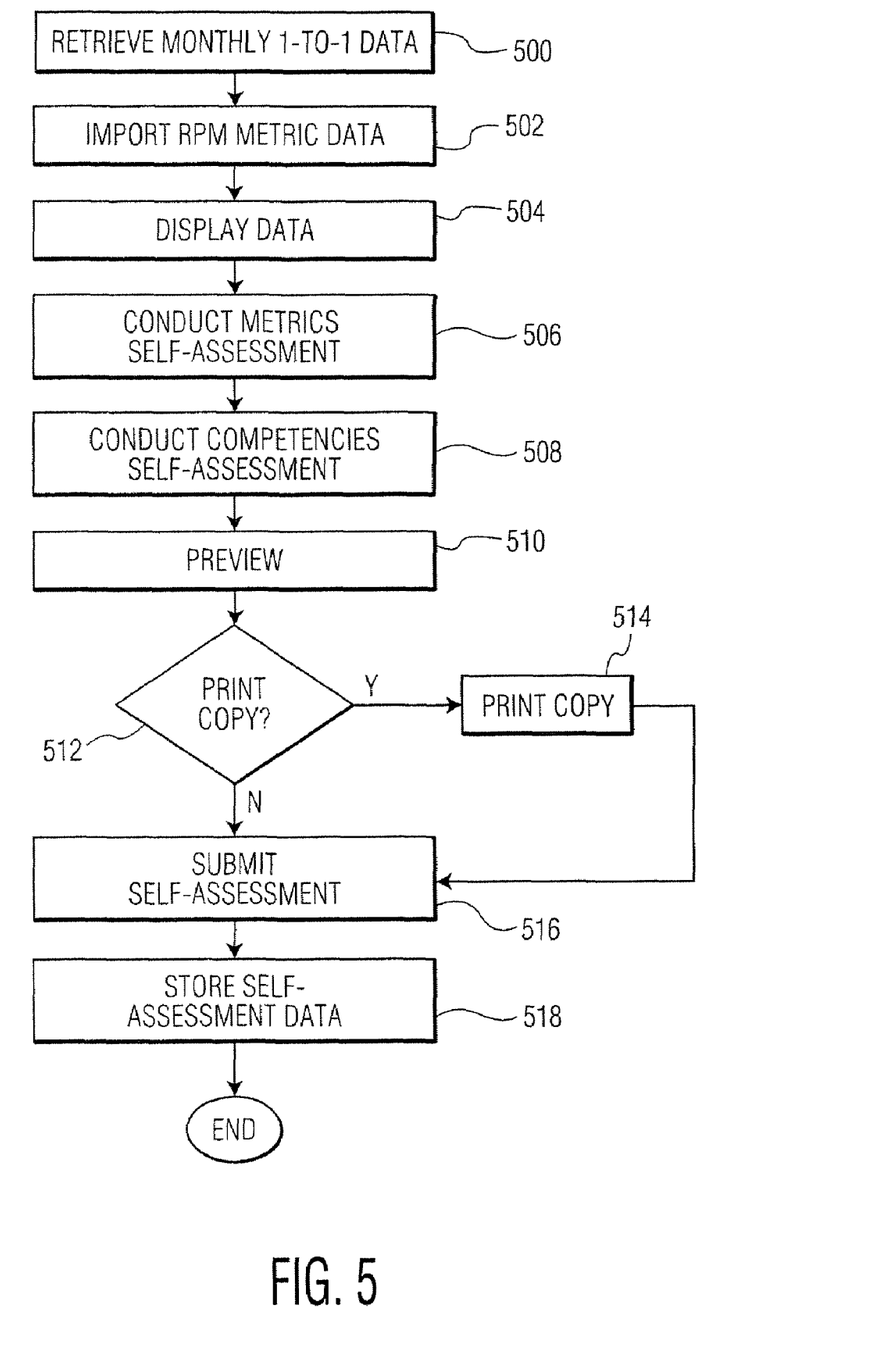
FIG. 5 is a flow chart showing a self-assessment process in accordance with a further embodiment of the present invention.

Referring now to FIG. 5, the data for an individual's 1-to-1 sessions and metrics data for use in the mid-year self-assessment are respectively retrieved and imported from database server 112 and external performance management system, as shown at steps 500 and 502, respectively. The retrieved and imported data is then displayed for the individual to view and assess at step 504 after the individual accesses the system at computer/terminal 100. The self-assessment process begins with the individual first assessing the individual's metrics at step 506 followed by assessment of the individual's competency as shown at step 508. The individual may be able to inform the team leader on how he/she performed with respect to a particular metric and provide ideas for improvement. The individual in assessing his/her competency, may comment on their development plan accomplishments and their needs. Their development plan accomplishments may include those activities they successfully completed during the first half of the year. Their needs include anything needed to assist the individual in accomplishing their goals, growing in their roles, etc. These may also include requests for coaching or training in particular areas.

The individual then previews the entire self-assessment at step 510 by way of display device 102 and has the option of printing a copy of the self-assessment as shown at steps 512 and 514 respectively, using a printer directly connected to the individual's terminal. In another embodiment, the printer may be connected to network 108 as a network printer—and thus be accessible from any computer/terminal linked to network 108. The individual may correct mistakes or add information during the preview.

After previewing the self-assessment, the individual then submits the self-assessment to the team leader at step 516 by way of data communication paths 114 and 116 and network 108. The team leader then views the self-assessment and uses it to prepare the individual's mid-year appraisal. The information imported or generated by the entire self-assessment process is then stored at step 518 onto database server 112.

Figure 6:
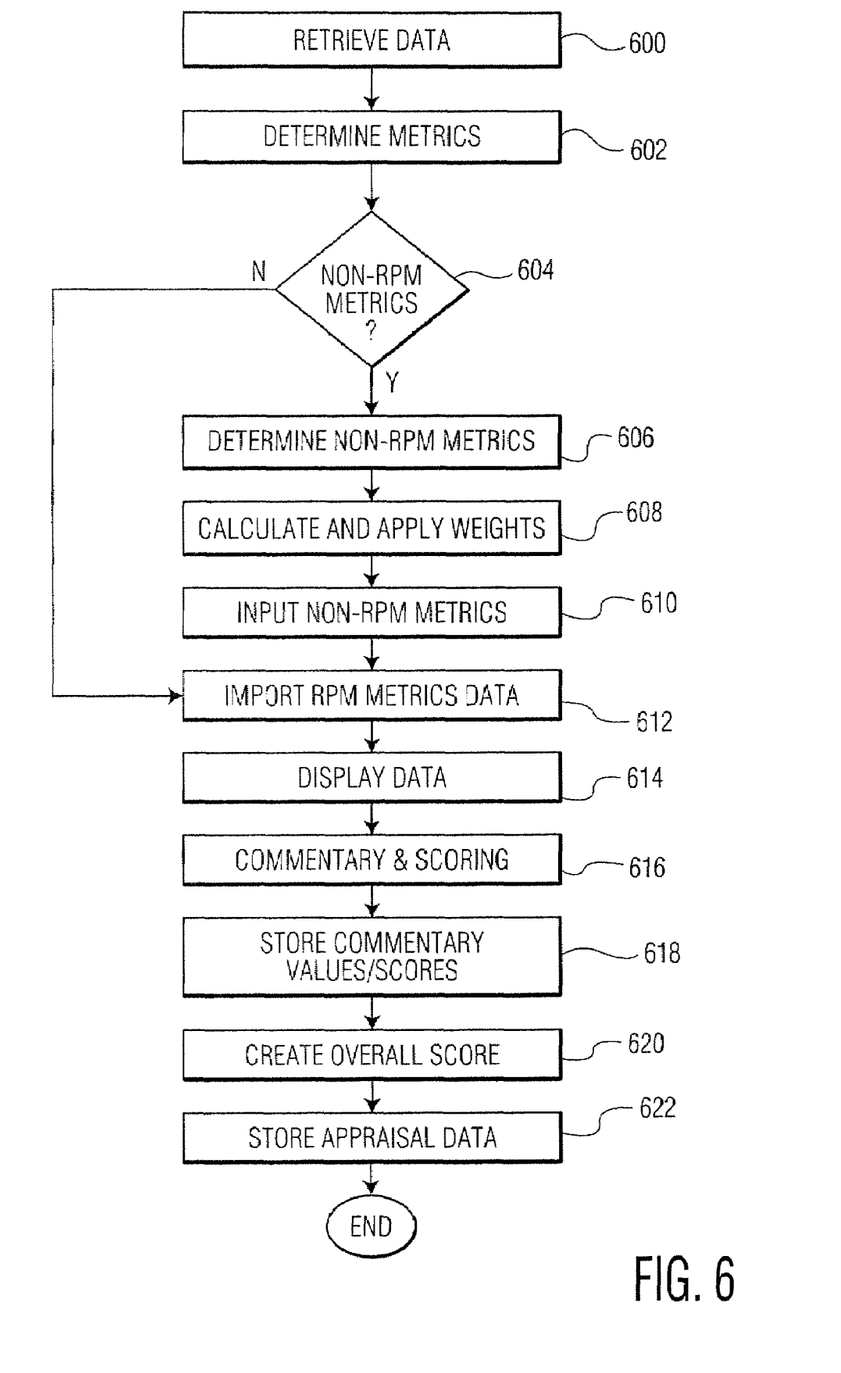
FIG. 6 is a flow chart showing an appraisal process in accordance with yet a further embodiment of the present invention.

Referring now to FIG. 6, a flow chart showing a year-end appraisal process in accordance with the present invention is shown. A selected individual's 1-to-1 session data and self-assessments data are retrieved from database server 112 at step 600 from database server 112. Next, where an external system such as the RPM system is linked to the present system, the team leader determines whether the individual has both RPM and non-RPM metrics at step 602 by viewing the imported data from external performance management system 112 on display device 106. First, the team leader checks to see if the individual has non-RPM metrics at step 604. If the individual only has RPM metrics, the RPM metrics are automatically imported from external performance management system 112, as shown at step 612. If, however, the individual has non-RPM metrics, the team leader then determines the non-RPM metrics at step 606, calculates and assigns appropriate weights based on predetermined criteria at step 608 and provides the non-RPM metrics data to the system via terminal 104 at step 610, after which the individual's RPM metrics are then imported at step 612. Examples of individuals who do not have RPM metrics include executive assistants, clerical staff, underwriting staff, individuals on special projects, individuals involved in training, etc.

The non-RPM and RPM metrics are then displayed for review by the team leader on display device 106 at step 614 and the team leader provides comments based on the data at step 616. The individual is scored based on the data and the team leader's assessment at step 616. These scores are then stored on to database server 112 at step 618 and later used to provide an overall score of the individual by database server 112 at step 620. At step 622, the information imported, produced or generated during the appraisal process is then stored for future use at database server 112.

It should be noted that the data communication paths disclosed above may be implemented by any system for exchanging data, such as, for example: an intranet; the internet; an extranet; WAN; LAN; a wireless communications network or the like.

Although the present invention has been disclosed with reference to specific forms and embodiments, it will be evident that a great number of variations may be made without departing from the spirit and scope of the present invention. For example: parts or steps may be reversed, equivalent elements may be substituted for those specifically disclosed, and certain features of the present invention may be used independently of other features all without departing from the present invention as defined in the appended claims.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
    selecting, by a computer-based system for performance assessment, a member of an entity;
    importing, by the computer-based system and from an external database, performance data for the member;
    importing, by the computer-based system, journal data for the member;
    facilitating, by the computer-based system, an appraisal of the performance data for the member and the journal data for the member;
    receiving, by the computer-based system, periodic performance feedback data for the member in response to the facilitating;
    storing, by the computer-based system, the periodic performance feedback data for the member;
    receiving, by the computer-based system, a mid-year self-assessment completed by the member in response to an assessment by the member of the periodic performance feedback data; and
    receiving, by the computer-based system, a mid-year appraisal of the member in response to an appraisal of the mid-year self-assessment and the member's performance.

2. The method according to claim 1, further comprising generating, by the computer-based system, a report.

3. The method according to claim 2, further comprising receiving, by the computer-based system, an acknowledgement that the report was received.

4. The method of claim 3, wherein the acknowledgement comprises a questionnaire.

5. The method of claim 1, further comprising receiving, by the computer-based system, competency feedback for the member, wherein the competency feedback is at least one of: selected from a standard set of comments and customized to address specific behaviors of the member.

6. The method of claim 1, further comprising generating, by the computer-based system, a preview of the periodic performance feedback data.

7. A system, comprising:
a processor for performance management;
a tangible, non-transitory memory configured to communicate with the processor,
the tangible, non-transitory memory having instructions stored thereon that, in response to execution by the processor, cause the processor to perform operations comprising:
selecting, by the processor, a member of an entity;
importing, by the processor and from an external database, performance data for the member;
importing, by the processor, journal data for the member;
facilitating, by the processor, an appraisal of the performance data for the member and the journal data for the member;
receiving, by the processor, periodic performance feedback data for the member in response to the facilitating;
storing, by the processor, the periodic performance feedback data for the member;
receiving, by the processor, a mid-year self-assessment completed by the member in response to an assessment by the member of the periodic performance feedback data; and
receiving, by the processor, a mid-year appraisal of the member in response to an appraisal of the mid-year self-assessment and the member's performance.

8. The system according to claim 7, wherein the processor is further configured to generate a report.

9. The system according to claim 8, further comprising receiving, by the processor, an acknowledgement that the report was received.

10. The system of claim 9, wherein the acknowledgement comprises a questionnaire.

11. The system of claim 7, further comprising receiving, by the processor, competency feedback for the member, wherein the competency feedback is at least one of: selected from a standard set of comments and customized to address specific behaviors of the member.

12. The system of claim 7, further comprising generating, by the computer-based system, a preview of the periodic performance feedback data.

13. An article of manufacture including a non-transitory, tangible computer readable storage medium having instructions stored thereon that, in response to execution by a computer-based system for performance management, cause the computer-based system to perform operations comprising:
selecting, by the computer-based system, a member of an entity;
importing, by the computer-based system and from an external database, performance data for the member;
importing, by the computer-based system, journal data for the member;
facilitating, by the computer-based system, an appraisal of the performance data for the member and the journal data for the member;
receiving, by the computer-based system, periodic performance feedback data for the member in response to the facilitating;
storing, by the computer-based system, the periodic performance feedback data for the member;
receiving, by the computer-based system, a mid-year self-assessment completed by the member in response to an assessment by the member of the periodic performance feedback data; and
receiving, by the computer-based system, a mid-year appraisal of the member in response to an appraisal of the mid-year self-assessment and the member's performance.

14. The article according to claim 13, further comprising generating, by the computer-based system, a report.

15. The article according to claim 14, further comprising receiving, by the computer-based system, an acknowledgement that the report was received.

16. The article of claim 15, wherein the acknowledgement comprises a questionnaire.

17. The article of claim 13, further comprising receiving, by the computer-based system, competency feedback for the member, wherein the competency feedback is at least one of: selected from a standard set of comments and customized to address specific behaviors of the member.

18. The article of claim 13, further comprising generating, by the computer-based system, a preview of the periodic performance feedback data.

* * * * *